United States Patent
Perni et al.

(10) Patent No.: US 7,240,764 B2
(45) Date of Patent: Jul. 10, 2007

(54) STEERING UNIT FOR AN ELECTRIC VEHICLE

(75) Inventors: Federico Perni, Trevi (IT); Luciano Pizzoni, Foligno (IT); Lucio Lopparelli, Foligno (IT)

(73) Assignee: Umbra Cuscinetti S.p.A., Foligno (IT)

( * ) Notice: Subject to any disclaimer, the term of this patent is extended or adjusted under 35 U.S.C. 154(b) by 38 days.

(21) Appl. No.: 11/076,574

(22) Filed: Mar. 9, 2005

(65) Prior Publication Data

US 2005/0206110 A1   Sep. 22, 2005

(30) Foreign Application Priority Data

Mar. 10, 2004   (EP)   ................................. 04425161

(51) Int. Cl.
*B62D 5/04*   (2006.01)
*F16H 55/18*   (2006.01)

(52) U.S. Cl. ........................ 180/444; 180/443; 74/409; 74/425; 74/4

(58) Field of Classification Search ................ 180/444, 180/443; 74/409, 425, 4
See application file for complete search history.

(56) References Cited

U.S. PATENT DOCUMENTS 4,653,602 A * 3/1987 Anders et al. .............. 180/444

2002/0173890 A1 * 11/2002 Miller ........................ 701/41
2004/0188170 A1 * 9/2004 Asada ........................ 180/443
2005/0016789 A1 * 1/2005 Asada ........................ 180/444
2005/0159866 A1 * 7/2005 Takeuchi et al. .............. 701/41

FOREIGN PATENT DOCUMENTS

| DE | 38 21 501 | 1/1989 |
| DE | 101 42 599 | 4/2003 |
| EP | 0 528 200 | 2/1993 |
| EP | 1 354 784 | 10/2003 |
| WO | 03/011674 | 2/2003 |

* cited by examiner

*Primary Examiner*—Lesley D. Morris
*Assistant Examiner*—Marlon Arce-Diaz
(74) *Attorney, Agent, or Firm*—Ladas and Parry LLP

(57) ABSTRACT

A steering unit of an electric vehicle is equipped with an electric motor having a tubular output shaft assembled so as to rotate around its own longitudinal axis, and a steering rod assembled through the output shaft and connected to the same output shaft by means of a screw-nut screw coupling so as to control the steering of a pair of wheels of the vehicle; the steering rod being equipped with a sleeve extending around the output shaft and having an internal thread connected to an external thread of the same output shaft.

7 Claims, 3 Drawing Sheets

STEERING UNIT FOR AN ELECTRIC VEHICLE

The present invention concerns a steering unit for an electric vehicle.

In particular, the present invention concerns a steering unit of the type including an electric motor having a tubular output shaft assembled so as to rotate around its own particular longitudinal axis; a tubular frame for housing the electric motor; and a steering rod assembled through the output shaft and protruding outside the same frame.

BACKGROUND OF THE INVENTION

The steering rod is connected to the output shaft of the electric motor by means of a screw-nut screw coupling, it is movable along the cited axis to control the steering of a pair of wheels of the vehicle, and has, normally, an external thread connected to an internal thread made on the output shaft of the electric motor.

Since the steering rod has the cited external thread and protrudes outside the cited frame, the steering units for known electric vehicles of the type described above show some drawbacks mainly arising from the fact that the correct operation of the screw-nut screw coupling can be compromised by dust, dirt, and/or by other polluting agents with which the external thread of the steering rod comes into contact.

SUMMARY OF THE INVENTION

The purpose of the present invention is to provide a steering unit for an electric vehicle that is without the drawbacks explained above and that is simple and economic to produce.

A steering unit for an electric vehicle is provided according to the present invention according to that claimed in claim 1.

BRIEF DESCRIPTION OF THE DRAWINGS

The present invention will now be described with reference to the enclosed drawings, that illustrate a non-limiting embodiment example of such, in which.

DETAILED DESCRIPTION OF THE INVENTION

Figure 1:
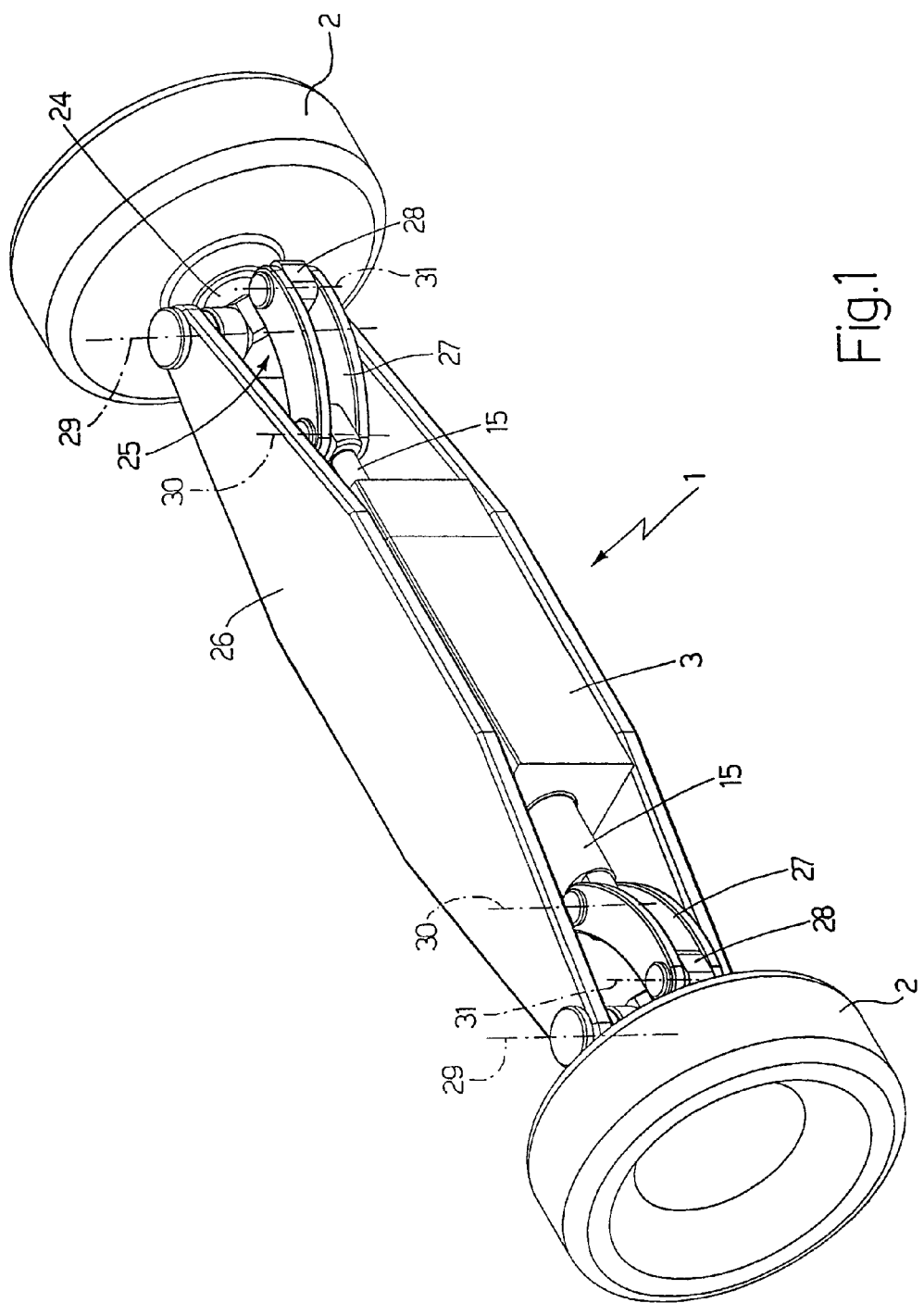
FIG. 1 is a schematic perspective view of a preferred embodiment of the steering unit of the present invention.

With reference to FIG. 1, denoted by 1, as a whole, is a steering unit able to control the steering of a pair of wheels 2 of an electric vehicle of known type and not shown such as, for example, a lift truck or an electric vehicle for the transportation and the handling of objects and/or people in an airport environment.

Figure 2:
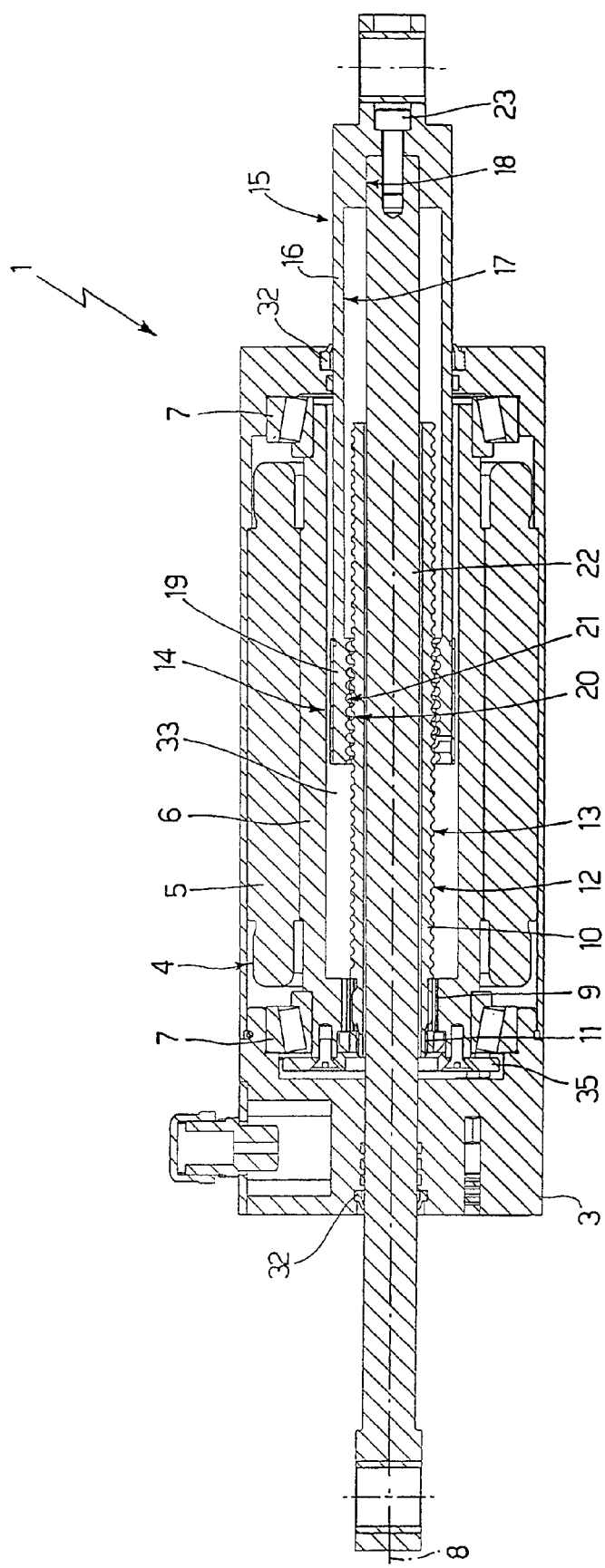
FIG. 2 is a first longitudinal section of the steering unit of FIG. 1.

According to that illustrated in FIG. 2, the unit 1 includes an external tubular frame 3 housing an electric motor 4, which includes, in turn, a stator 5 and a rotor 6 assembled inside the stator 5 to rotate, as regards the same stator 5 and through the interposition of a pair of rolling bearings 7, around its own longitudinal axis 8.

The rotor 6 is connected in an angularly fixed manner by means of a splined coupling 9 to a tubular output shaft 10, which is entirely assembled inside the frame 3 coaxially to the axis 8, it is locked along the axis 8 by means of a threaded ring 11, and has an external thread 12 made on an external surface 13 of the same shaft 10.

The shaft 10 is connected by means of a recirculating ball screw-nut screw coupling 14 of known type to a steering rod 15 including a sleeve 16, which extends around the axis 8 and around the shaft 10, and has a widened portion 17 and a narrowed portion 18 disposed in sequence along the axis 8. The portion 17 is equipped with an end section 19, which is limited internally by a surface 20 coaxial to the axis 8, and has an internal thread 21 made on the same surface 20 and connected to the thread 12.

The rod 15 also includes a cylindrical rod 22, which engages the portion 18, is fixed to the sleeve 16 by means of a fastening screw 23, and protrudes from the portion 18 coaxially to the axis 8 so as to extend through the shaft 10 and to protrude outside the frame 3.

With reference to FIG. 1, each wheel 2 is assembled on a relative wheel hub made on a first arm 24 of an equalizer 25, which is hinged to a frame 26 of the vehicle (not shown) to oscillate, as regards the frame 26 and under the force of a connecting rod 27 interposed between the rod 15 and a second arm 28 of the equalizer 25, around a fulcrum axis 29 basically vertical and transversal to the axis 8. The connecting rod 27 extends between two axes 30, 31 parallel to the axis 29, and of which the axis 30 is the rotation axis of the connecting rod 27 as regards the rod 15 and the axis 31 is the rotation axis of the connecting rod 27 as regards the arm 28.

The frame 3 is axially limited by two ring-shaped gaskets 32, which are assembled coaxially to the axis 8, are interposed between the frame 3 and the sleeve 16 and, respectively, between the frame 3 and the rod 22, and they delimit a chamber 33 entirely containing the screw-nut screw coupling 14, i.e. the shaft 10 and the section 19. The presence of the gaskets 32 allows, therefore, the lubrication of the coupling 14 exclusively during the assembly of the unit 1.

Figure 3:
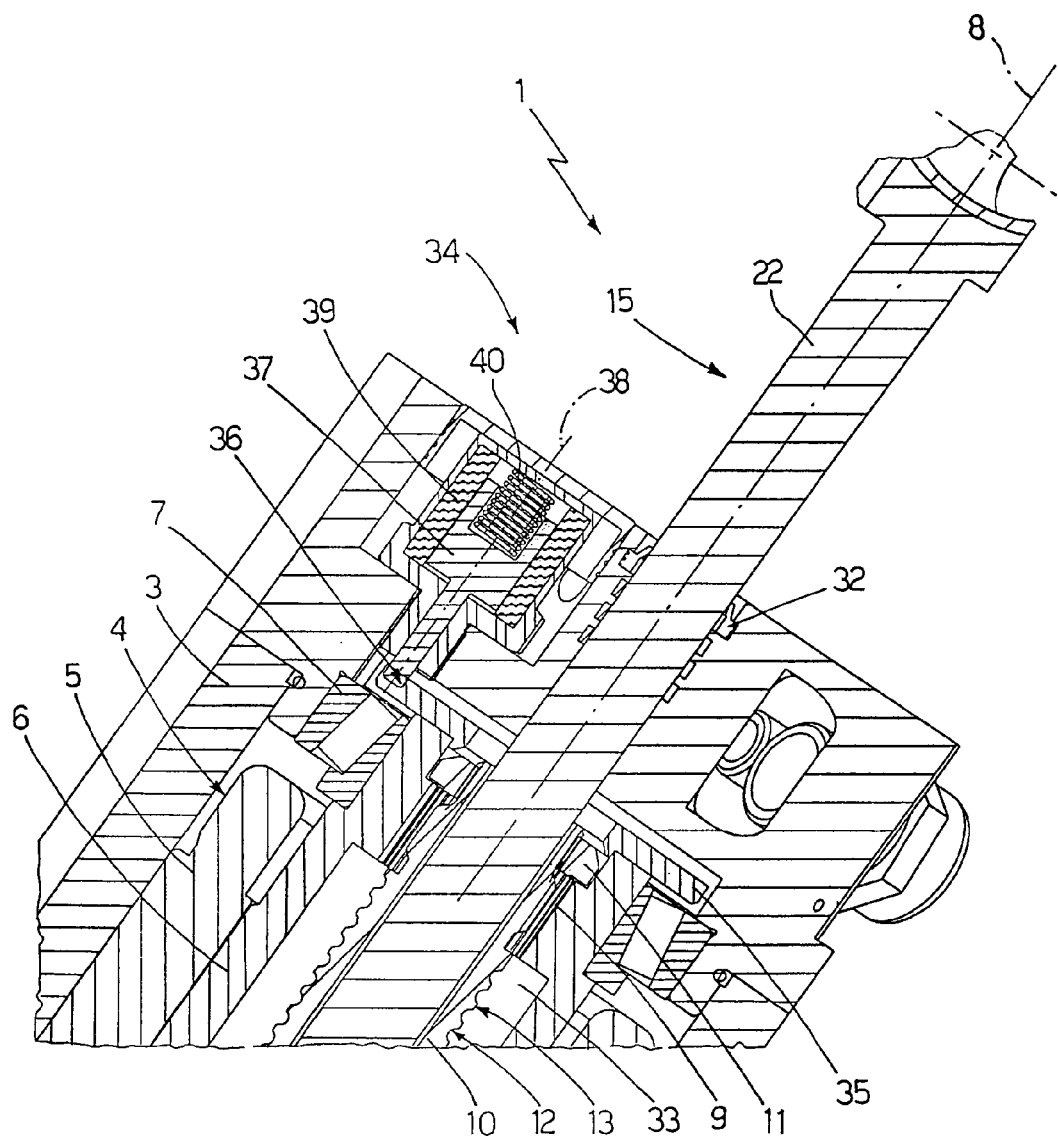
FIG. 3 is a second longitudinal section of the steering unit of FIG. 1.

According to that illustrated in FIG. 3, the unit 1 is further equipped with a latching device 34 able to angularly lock the shaft 10 around the axis 8 and to prevent, therefore, the axial displacement of the rod 15 in the absence of power supply to the motor 4 allowing the vehicle (not shown) to maintain the same direction of advancement held before the interruption of the electricity supply.

The device 34 includes a ring-shaped plate 35, which is fixed to the rotor 6 at a right angle to the axis 8, it extends around the rod 22, and has a plurality of seats 36 made parallel to the axis 8 and uniformly distributed around the same axis 8.

The device 34 further includes a pin 37, which has a longitudinal axis 38 parallel to the axis 8, and is sliding assembled inside a tubular electromagnet 39, that is fixed to the frame 3 coaxially to the axis 38, and is electrically connected to the motor 4 to keep, normally, the pin 37 in a position of release, in which the same pin 37 is positioned outside the seats 36.

In the absence of power supply to the motor 4 and, therefore, to the electromagnet 39, the pin 37 is moved, under the force of a spring 40 interposed between the frame 3 and the pin 37, into a position of engagement, in which the same pin 37 engages one of the seats 36.

The motor 4 is equipped with a plurality of sensors (not shown), in the case in point Hall effect sensors, which are used both for the switching of the phases to be powered, as well as to control the axial position of the rod 15 avoiding the use of a resolver and/or encoder. For the control of the axial position of the rod 15, the motor 4 is further equipped with an electronic control box (not shown) able to calculate the axial position of the rod 15 depending on the number of times that the permanent magnets of the rotor 6 pass in front of the cited sensors (not shown) and depending on the pitch of the threads 12 and 21. The operation of the steering unit 1 is easily deducible from that explained above and does not require further explanation.

The invention claimed is:

1. Steering unit of an electric vehicle, the steering unit comprising an electric motor (4) having a tubular output shaft (10) assembled so as to rotate around its own particular longitudinal axis (8); and a steering rod (15) assembled through said output shaft (10) and connected to the same output shaft (10) by means of a screw-nut screw coupling (14) in order to move along said axis (8) and control the steering of a pair of wheels (2) of the vehicle; and being characterized in that the output shaft (10) has an external thread (12); the steering rod (15) includes a sleeve (16) extending around the same output shaft (10) and having an internal thread (21) connected to said external thread (12); said sleeve (16) comprises a widened portion (17) extending around said output shaft (10) and a narrowed portion (18): the steering rod (15) further comprises a rod (22) protruding from said narrowed portion (18) to engage said output shaft (10).

2. Steering unit as claimed in claim 1, in which the screw-nut screw coupling (14) is a recirculating ball screw-nut screw coupling.

3. Steering unit as claimed in claim 1 and further comprising a tubular frame (3) able to house said electric motor (4) and two ring-shaped gaskets (32) able to axially limit the frame (3) to define, together with the same frame (3), a chamber (33) containing the whole screw-nut screw coupling (14).

4. Steering unit as claimed in claim 1 and further comprising a latching device (34) to angularly lock the output shaft (10) around said axis (8) in the absence of power supply of the electric motor (4).

5. Steering unit as claimed in claim 4, in which the latching device (34) comprises a plurality of seats (36) distributed around said axis (8) and angularly integral with said output shaft (10), at least one pin element (37) movable between a position of engagement, in which the same pin element (37) engages a said seat (36), and a position of release, elastic pushing means (40) acting on the pin element (37) to keep the pin element (37) in said position of engagement, and actuator means (39) to move the pin element (37) into said position of release against the action of said elastic pushing means (40).

6. Steering unit as claimed in claim 5, in which said actuator means (39) comprise an electromagnet (39) electrically connected to said electric motor (4).

7. Steering unit as claimed in claim 1, in which the electric motor (4) comprises a rotor (6) and is equipped with a plurality of Hall effect sensors for the switching of the phases to be powered and with an electronic control box able to control an axial position of said steering rod (15) depending on the number of times the permanent magnets of the rotor (6) pass in front of said sensors and on the pitch of said internal and external threads (21, 12).

* * * * *